(12) United States Patent
Blondé et al.

(10) Patent No.: US 7,938,546 B2
(45) Date of Patent: May 10, 2011

(54) METHOD OF ILLUMINATING A PROJECTING IMAGER, CORRESPONDING SYSTEM AND PROJECTOR

(75) Inventors: Laurent Blondé, Thorigne Fouillard (FR); Eugene M. O'Donnell, Fishers, IN (US); Khaled Sarayeddine, Nouvoitou (FR)

(73) Assignee: Thomson Licensing, Boulogne-Billancourt (FR)

( * ) Notice: Subject to any disclaimer, the term of this patent is extended or adjusted under 35 U.S.C. 154(b) by 760 days.

(21) Appl. No.: 11/472,629

(22) Filed: Jun. 22, 2006

(65) Prior Publication Data
US 2007/0052932 A1 Mar. 8, 2007

(51) Int. Cl.
*G03B 21/20* (2006.01)

(52) U.S. Cl. .................. 353/85; 345/590; 345/591

(58) Field of Classification Search ............ 353/85; 345/82, 83, 589, 590, 591, 592, 593, 594, 345/595, 596, 597, 598, 599, 600, 601, 602, 345/603, 604, 605
See application file for complete search history.

(56) References Cited

U.S. PATENT DOCUMENTS

| | | | | |
|---|---|---|---|---|
| 5,917,558 A * | 6/1999 | Stanton | ............... | 348/743 |
| 6,224,216 B1 | 5/2001 | Parker et al. | | |
| 6,330,039 B2 * | 12/2001 | Matsui et al. | ............... | 348/742 |
| 6,411,047 B1 * | 6/2002 | Okazaki et al. | ............... | 315/312 |
| 6,726,329 B2 * | 4/2004 | Li et al. | ............... | 353/20 |
| 6,769,772 B2 * | 8/2004 | Roddy et al. | ............... | 353/31 |
| 6,857,748 B2 * | 2/2005 | Roddy et al. | ............... | 353/31 |
| 6,869,190 B2 * | 3/2005 | Goto et al. | ............... | 353/85 |
| 6,882,379 B1 * | 4/2005 | Yokoyama et al. | ............... | 349/61 |
| 6,939,027 B2 * | 9/2005 | Harumoto | ............... | 362/336 |
| 6,961,038 B2 * | 11/2005 | Yoshinaga et al. | ............... | 345/88 |
| 6,991,336 B2 * | 1/2006 | Matsui | ............... | 353/94 |
| 7,029,129 B2 * | 4/2006 | Shimada | ............... | 353/94 |
| 7,052,138 B2 * | 5/2006 | Matsui | ............... | 353/31 |
| 7,083,284 B2 * | 8/2006 | Peterson et al. | ............... | 353/31 |
| 7,131,735 B2 * | 11/2006 | Yokoyama | ............... | 353/98 |
| 7,165,845 B2 * | 1/2007 | Takeda et al. | ............... | 353/31 |
| 7,237,910 B2 * | 7/2007 | Kumai | ............... | 353/97 |
| 7,258,450 B2 * | 8/2007 | Koyama et al. | ............... | 353/94 |

(Continued)

FOREIGN PATENT DOCUMENTS
WO WO 2004102245 A1 * 11/2004

OTHER PUBLICATIONS
Search Report dated Feb. 22, 2006.

*Primary Examiner* — Georgia Y Epps
*Assistant Examiner* — Bao-Luan Le
(74) *Attorney, Agent, or Firm* — Robert D. Shedd; Robert B. Levy; Jorge Tony Villabon

(57) ABSTRACT

The invention is directed at least in part to a method of illuminating an imager for projecting images, implementing light-emitting diodes of different colors, the diodes being designed to provide a beam illuminating the imager. According to various embodiments of the invention, for a set of at least one imager, the method includes receiving each image of the set; determining a color base dependent on the set of at least one image, called a secondary color base; and dynamically controlling the diodes according to the secondary color base. The invention also relates to a system implementing the method and a projector comprising such a system.

13 Claims, 8 Drawing Sheets

U.S. PATENT DOCUMENTS

| | | | |
|---|---|---|---|
| 7,287,860 B2* | 10/2007 | Yoshida et al. | 353/31 |
| 7,300,155 B2* | 11/2007 | Miyazawa et al. | 353/30 |
| 7,303,284 B2* | 12/2007 | Imade | 353/31 |
| 7,391,475 B2* | 6/2008 | Pate et al. | 348/602 |
| 2002/0135553 A1* | 9/2002 | Nagai et al. | 345/89 |
| 2003/0218794 A1* | 11/2003 | Takeda et al. | 359/292 |
| 2003/0227577 A1* | 12/2003 | Allen et al. | 348/742 |
| 2004/0008288 A1* | 1/2004 | Pate et al. | 348/742 |
| 2004/0125344 A1* | 7/2004 | Matsui | 353/94 |
| 2004/0196225 A1* | 10/2004 | Shimada | 345/82 |
| 2004/0207816 A1* | 10/2004 | Omoda et al. | 353/31 |
| 2005/0007390 A1* | 1/2005 | Yoshida et al. | 345/690 |
| 2005/0030400 A1 | 2/2005 | Shigeta | |
| 2005/0052376 A1* | 3/2005 | Shivji | 345/82 |
| 2005/0088625 A1* | 4/2005 | Imade | 353/31 |

\* cited by examiner

METHOD OF ILLUMINATING A PROJECTING IMAGER, CORRESPONDING SYSTEM AND PROJECTOR

This application claims the benefit, under 35 U.S.C. §119 of French Patent Application 05/06474, filed Jun. 24, 2005.

1 FIELD OF THE INVENTION

The invention relates to the field of image projection.

More specifically, the invention relates to an illumination system for an imager (also called micro-display) in a front or overhead video projector.

2. STATE OF THE ART

According to the state of the art, as illustrated by FIG. 1, an illumination system 10 lighting an imager 11 is implemented.

Conventionally, the illumination system 10 comprises;
an illumination source 100 with elliptical reflector,
a coloured wheel 107;
a rectangular guide 102; and
a system of several relay lenses 104 to 106.

The illumination source 100 uses a light beam 101 to light the coloured wheel 107 placed at the input of the rectangular guide 102, at the focus of the elliptical reflector of the source 100. The rectangular guide 102 is used to convert the circular section of the lighting beam into a rectangular section and make the beam spatially uniform. The output of the guide 102 is displayed on the imager 11 via the system of relay lenses, of which there are at least two, but often three or four.

According to another state of the art disclosed, for example, in U.S. Pat. No. 6,224,216, the illumination system with coloured wheel is replaced by a system based on LEDs (light-emitting diodes). The green, blue and red LEDs are switched on sequentially to create a saturated colour illumination beam that is green, blue and red in turn. In certain configurations, white, magenta, cyan or yellow beams can also be provided. In all cases, the coloured beams of each colour are of fixed duration, and independent of the projected image. The imager modulates the colour of each pixel according to the image in a predetermined colour base.

These techniques present the drawback of not optimally managing energy consumption.

3. SUMMARY OF THE INVENTION

The object of the invention is to overcome these drawbacks in the prior art.

More particularly, the object of the invention is to optimize energy consumption while allowing good quality images to be projected.

To this end, the invention proposes a method of illuminating an imager for projecting images, implementing light-emitting diodes of different colours, the diodes being designed to provide a beam illuminating the imager. According to the invention, for a set of at least one image, the method comprises:
a step for receiving each image of the set;
a step for determining a colour base dependent on the set of at least one image, called a secondary colour base;
a step for dynamically controlling the diodes according to said secondary colour base.

According to an advantageous characteristic, the secondary colour base comprises at least one secondary colour corresponding to a mixture of two primary colours.

According to a particular characteristic, the secondary colour base comprises three colours.

According to advantageous characteristics, the step for dynamically controlling the diodes comprises a step for controlling the on time of the diodes and/or their light intensity according to the secondary colour base.

According to a particular characteristic, the step for dynamically controlling the diodes comprises a step for selecting the diodes according to the secondary colour base.

Preferably, in the step for receiving the set of at least one image, each image is received in a colour base, called a primary colour base, the primary colour base being distinct from the secondary colour base, the step for determining a colour base comprising a step for converting each image from the primary colour base to the secondary colour base.

According to an advantageous characteristic, the step for determining a colour base comprises a step for calculating an area encompassing at least 90% of the pixels of the images of the set, the colour base being determined according to the area.

According to a particular characteristic, the area encompasses 100% of the pixels of the images of the set.

Advantageously, the area forms a polygon.

According to another preferred characteristic, in the step for receiving the set of at least one image, each image is received in the secondary colour base, the step for determining a colour base comprising a step for receiving data representative of the secondary colour base.

According to a particular characteristic, the set comprises a single image.

The invention also relates to an illumination system intended to light an imager for projecting images and comprising light-emitting diodes of different colours, the diodes being designed to provide a beam illuminating the imager. According to the invention, the system is noteworthy in that, for a set of at least one image, it comprises:
means of receiving each image of the set;
means of determining a colour base dependent on the set of at least one image, called a secondary colour base;
means of dynamically controlling the diodes according to the secondary colour base.

The invention also relates to an image projector comprising:
at least one projection lens;
at least one imager;
at least one illumination system as described previously according to the invention and intended to light said imager.

4. LIST OF FIGURES

The invention will be better understood, and other features and advantages will become apparent from reading the description that follows, the description referring to the appended drawings in which.

Figure 1:
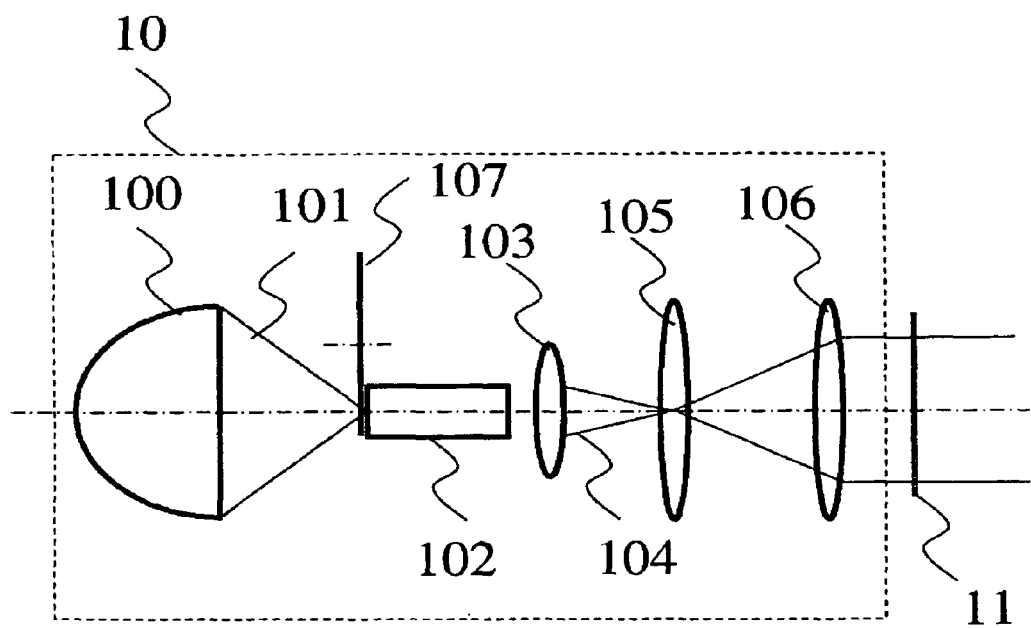
FIG. 1 illustrates an illumination system known per se.
Figure 2:
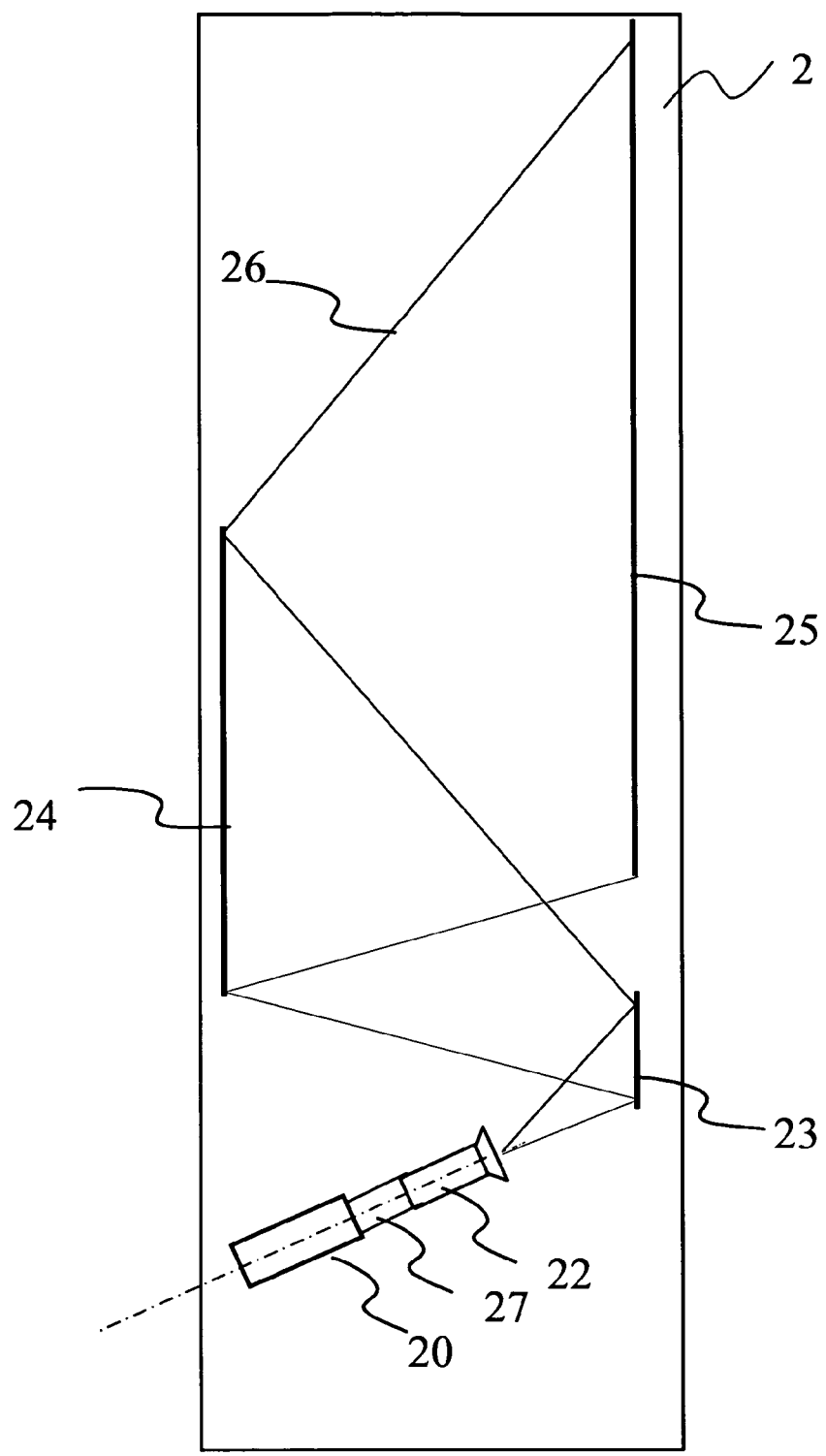
FIG. 2 is an extremely schematic diagram of an overhead projector according to an embodiment of the invention.
Figure 3:
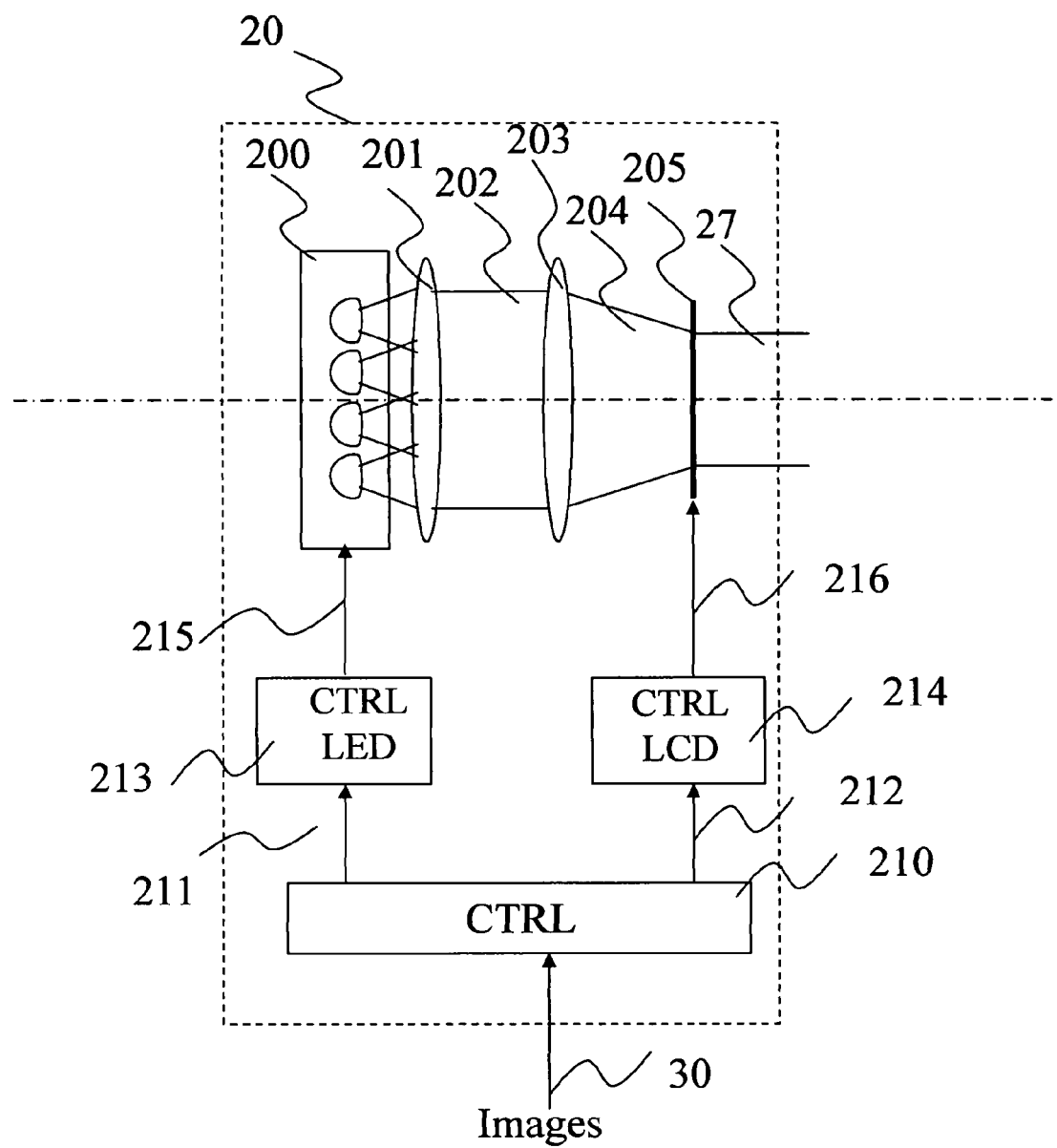
Figure 4:
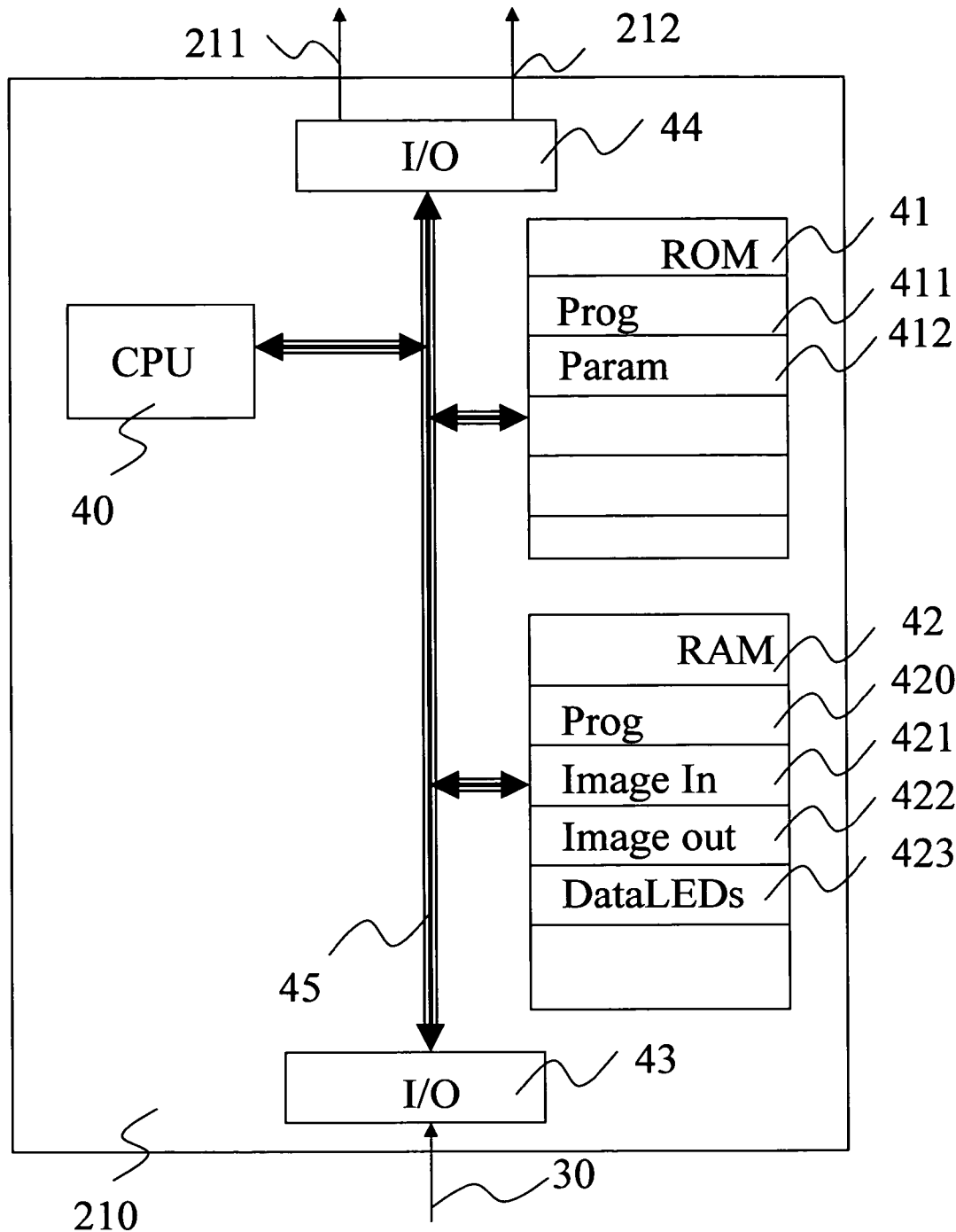
Figure 5:
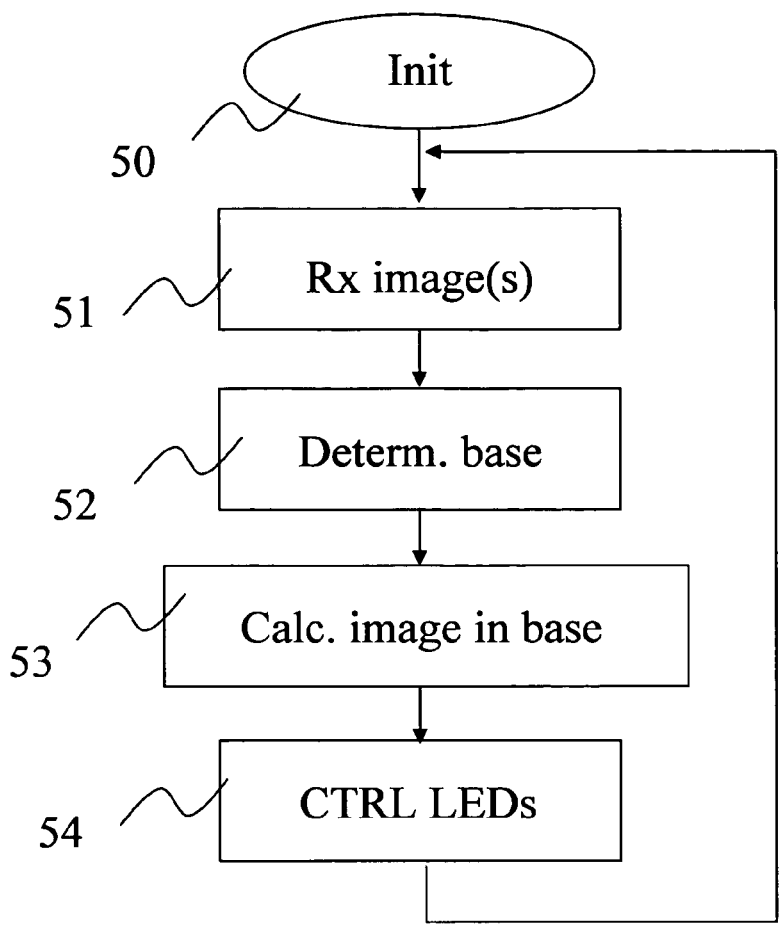
Figure 6:
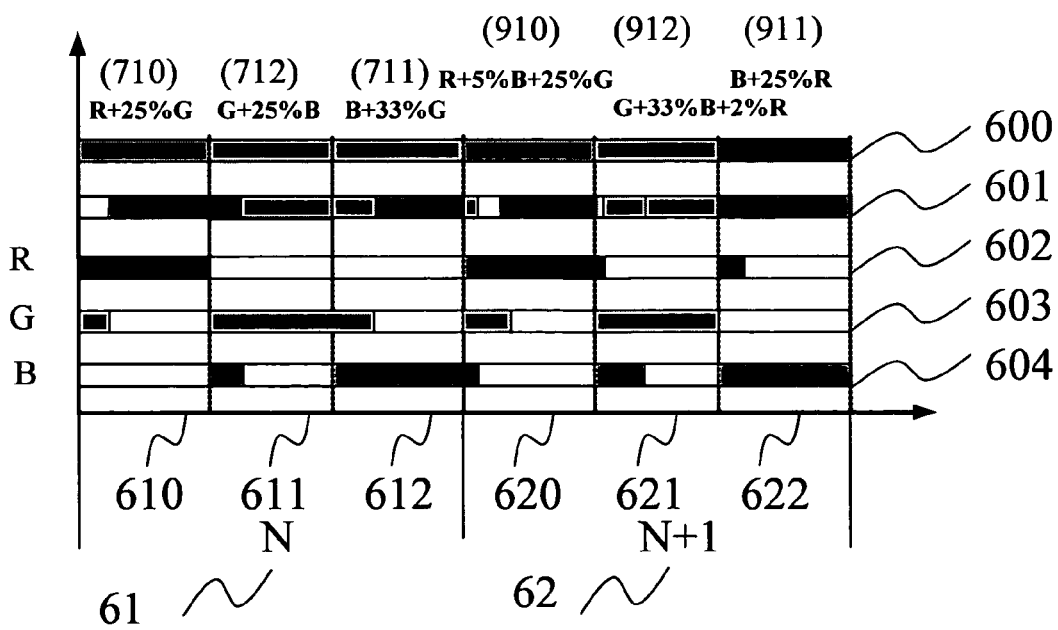
Figure 7:
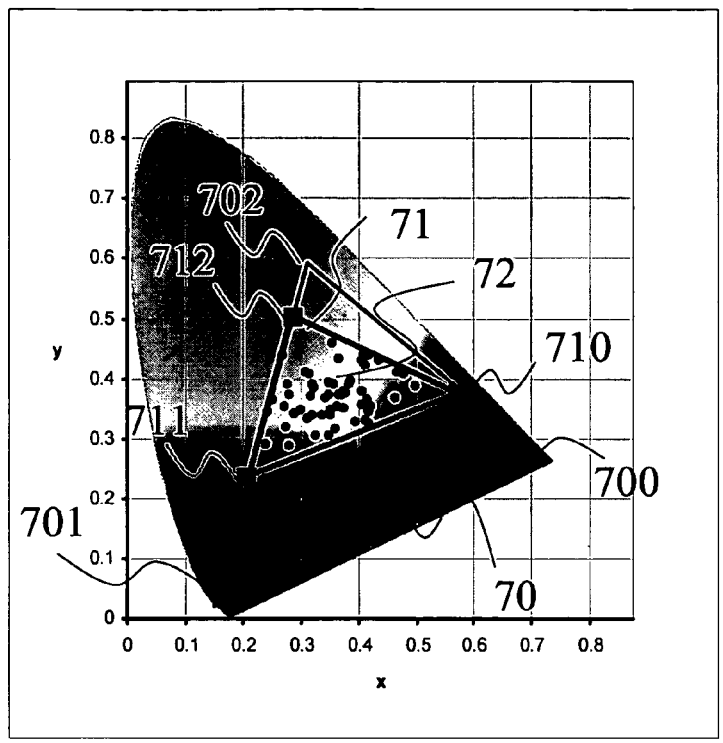
Figure 8:
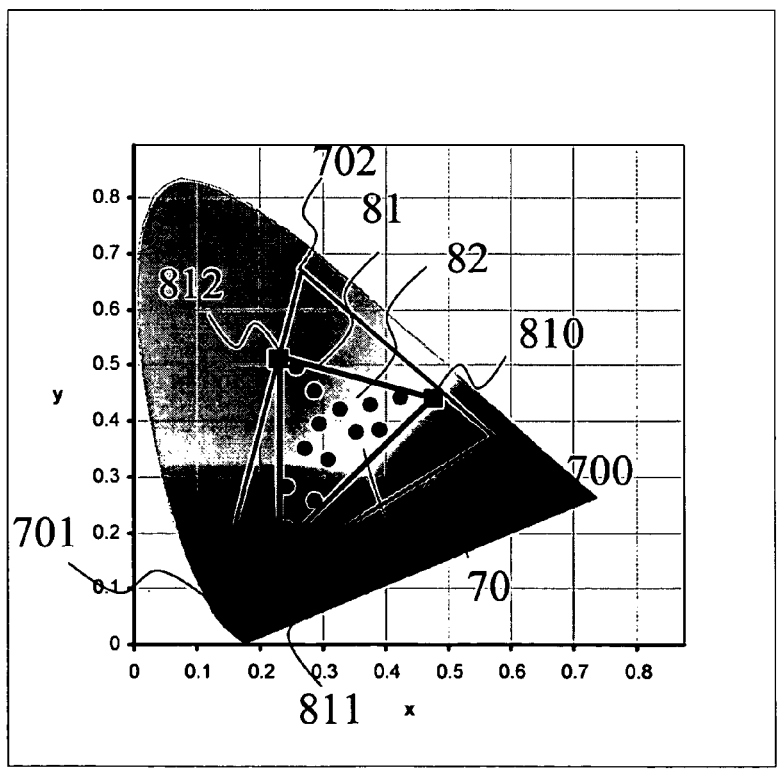
Figure 9:
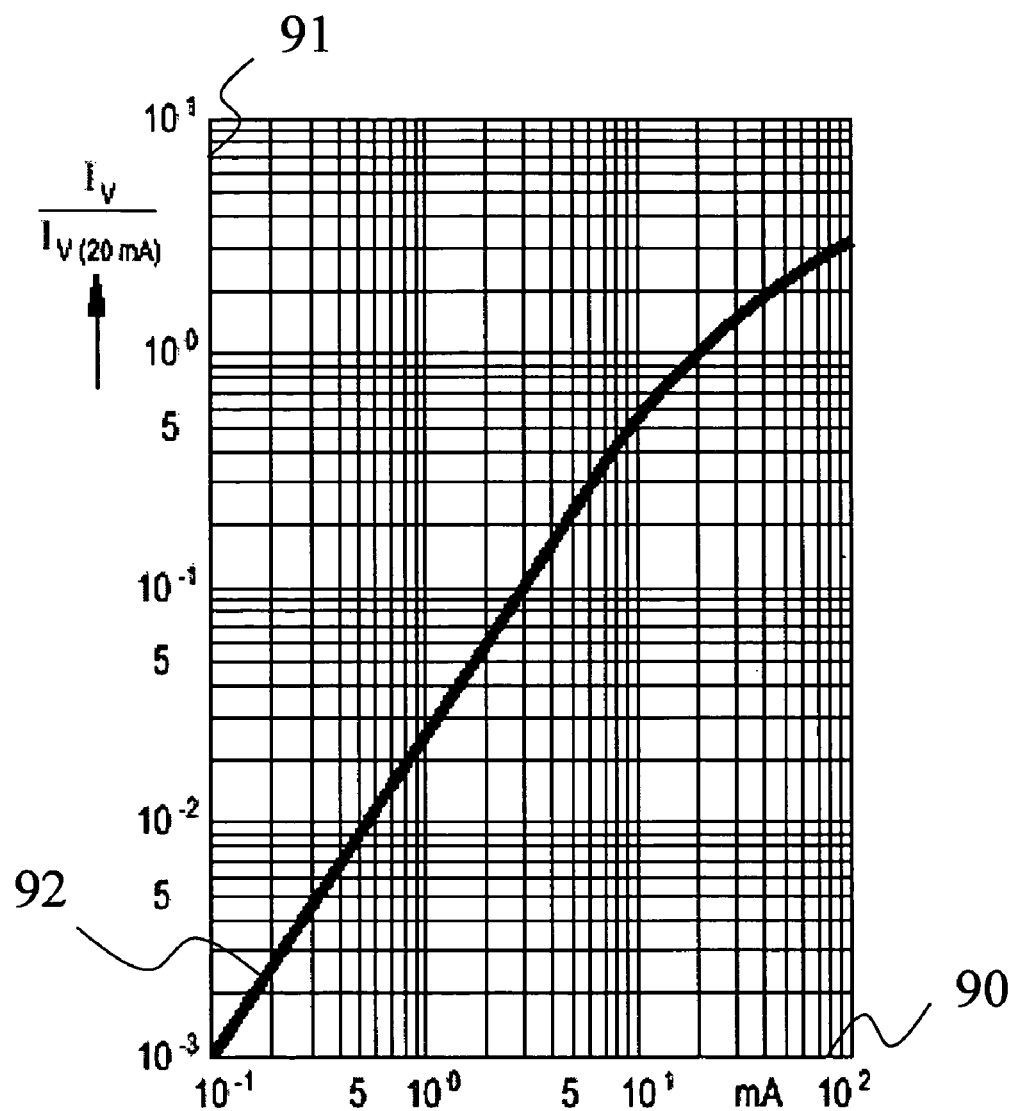
Figure 10:
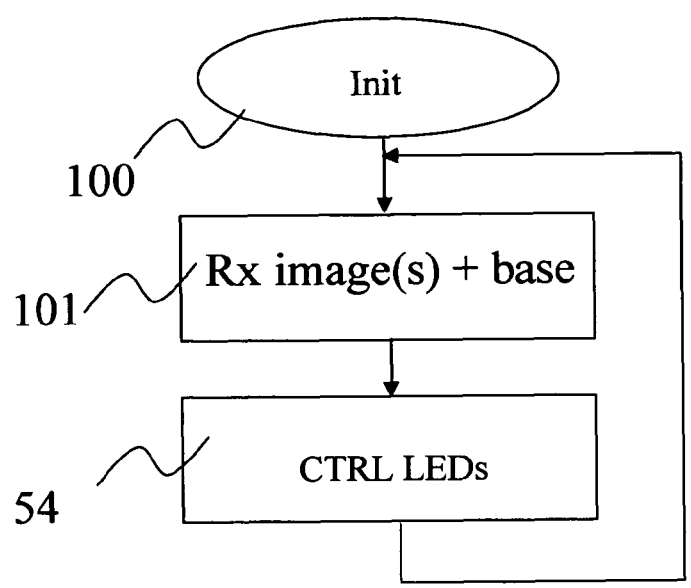
Figure 11:
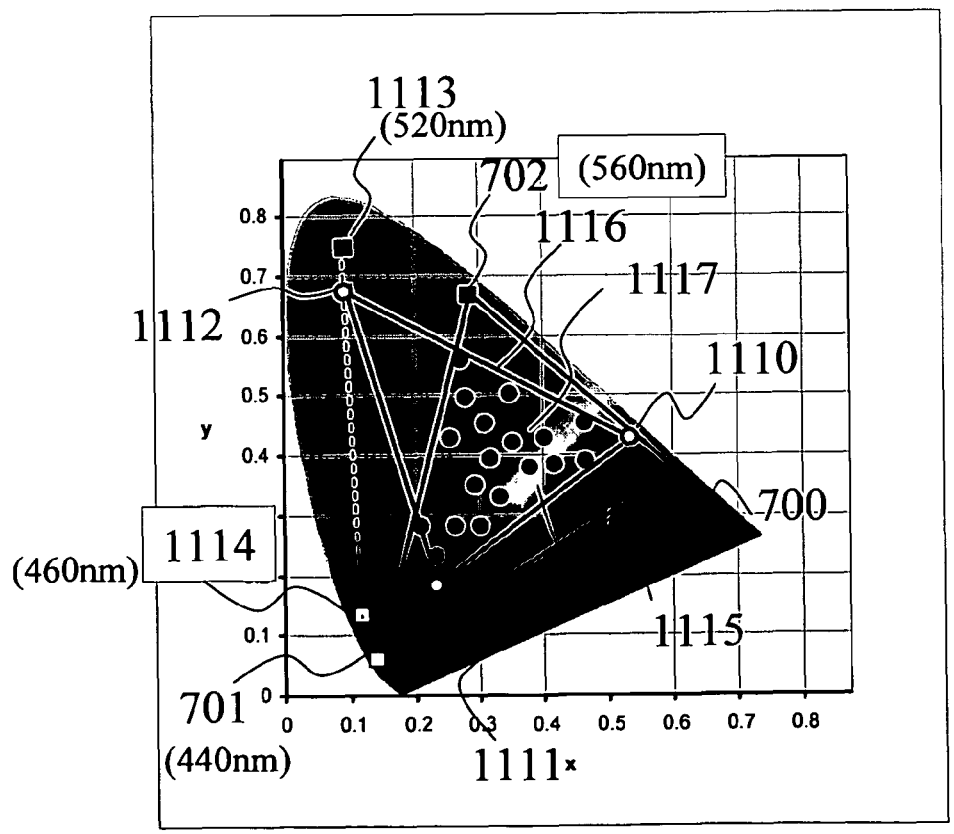

FIG. 3 presents an illumination system implemented in the overhead projector of FIG. 2;

FIG. 4 illustrates means of controlling the illumination system of FIG. 3;

FIG. 5 presents an illumination management algorithm implemented in the control means of FIG. 4;

FIG. 6 gives an example of dynamic illumination management according to the invention;

FIGS. 7, 8 and 11 respectively illustrate a particular case of colour management in an image according to the invention;

FIG. 9 presents the control of the light intensity in an LED of the system of FIG. 3; and FIG. 10 presents a variant of the illumination management algorithm implemented in the control means of FIG. 4.

5. DETAILED DESCRIPTION OF THE INVENTION

The main principle of the invention is therefore based on a dynamic management of the illumination beam, the colours of which (nature and/or duration and/or selection of LEDs) depend on each image projected.

FIG. 2 is a highly schematic block diagram of an overhead projector 2 according to a first embodiment of the invention.

The projector 2 comprises:
an illumination system 20;
a lens 21 receiving an illumination beam 26 created by the illumination system 20 and producing a beam 25;
an overhead projection screen 24 lit by the beam 25; and
two folding mirrors 22 and 23 folding the beam 25 and being used to reduce the depth of the projector 2.

The lens 21, the mirrors 22 and 23 and the screen 24, and their arrangement are well known to those skilled in the art and are not described in any more detail.

FIG. 3 illustrates in detail the illumination system 20 with transmissive imager and which comprises:
an array of illuminating LEDs 200;
a lens 201 collimating the beams transmitted by each of the LEDs of the array 200 to produce a beam 202 that is substantially collimated (a beam being in this case substantially collimated if it does not diverge by ±6° in relation to its optical axis);
a convergence lens 203;
an imager 205 of the transmissive type (transmissive LCD) roughly perpendicular to the axis of the beam 202, lit by the beam 202 having passed through the lens 203, the imager 205 producing an imaging beam 27;
an LED driver 213 which manages the switching on and off of each of the LEDs of the array 200 via a link 215;
an imager driver 214 which controls the imager 205 via a link 216; and
a controller 210 which controls the drivers 213 and 214 via respective links 211 and 212 based on data associated with the images to be projected, that it receives sequentially via a link 30.

The LED array comprises red, green or blue LEDs. When the red, green or blue LEDs are switched on in turn, they respectively produce sub-beams of the beam 202 that are respectively red, green and blue. The distribution of the LEDs on the array 200 is such that the lighting of the imager by each of the red, green and blue sub-beams is substantially uniform. The number of the LEDs of each colour depends on the respective efficiency of these LEDs and is such that the sub-beams have a similar intensity. These LEDs are, for example, monochrome power LEDs produced by Osram® or LumiLeds®. The number of LEDs of each colour depends on the luminance of each of the LEDs and/or of the sensitivity of the human eye to each of the colours. It is possible, for example, to have a uniform distribution of eight green LEDs, four red LEDs and four blue LEDs.

FIG. 4 illustrates the controller 210 in detail.

The controller 210 comprises, interlinked by an address and data bus 45:
a microprocessor 40;
a non-volatile read only memory (ROM) 41;
a random access memory (RAM) 42;
an input/output interface 43 linked to an input of the projector 2 (not shown) which receives data representative of images to be projected via the link 30; and
an input/output interface 44.

The input/output interface 44 transmits the LED commands to the driver 213 and the commands and the data corresponding to the images to be projected to the driver 214.

Each of the elements illustrated in FIG. 4 is well known to those skilled in the art. These common elements are not described here.

It should be noted that the word "register" used in the description denotes, in each of the memories mentioned, both a small capacity memory area (a few bits) and a large capacity memory area (enabling an entire program or all the data representative of an image to be stored).

The ROM memory 41 comprises in particular:
a program "prog" 411; and
configuration parameters 412 (for example relating to the array 200 and the imager 205, or depending on a setting of the projector 2 (for example, the intensity of the projected image) or even depending on parameters specific to the search for a secondary colour base (for example, the percentage of pixels needing to satisfy a condition of positive coordinates in a secondary colour base).

According to a variant of the invention, the ROM memory 41 comprises data representative of predetermined secondary colour bases.

The algorithms implementing the steps of the method described below in particular with regard to FIG. 5 are stored in the ROM memory 41 associated with the projector 2 implementing these steps. On power up, the microprocessor 40 loads and runs the instructions of these algorithms.

The random access memory 42 comprises in particular:
in a register 420, the program 411 for operating the microprocessor 40, loaded when the projector 2 was powered up;
data 421 representative of an image received via the interface 43;
data 422 representative of an image to be transmitted to the imager 205 via the interface 44; and
data 423 for commands intended for the driver 213.

FIG. 5 illustrates a management algorithm for the drivers 213 and 214 implemented by the controller 210.

The algorithm starts with an initialization step 50 during which the various parameters and useful data are initialized.

Then, during a step 51, the controller waits for then receives data 421 representative of an image to be projected, or frame 61, this image being encoded in a primary colour base (typically red, green and blue).

Then, during a step 52, the microprocessor 40 determines a new colour base dependent on the image received and called a secondary colour base. This secondary colour base corresponds to a triangle 71 covering an area 72 of a gamut comprising each of the pixels of the image and represented, by way of illustration, in FIG. 7.

The area 72 is inscribed in the triangle 71, the corners of which are the points 710, 711, and 712 and which then constitute the new secondary colour base in which all the pixels of the area 72 can be expressed. Preferably, all the pixels of the area 72 can be expressed with positive coefficients in the secondary colour base (negative coefficients corresponding to points outside the triangle concerned).

The saturated red, green and blue colours are respectively represented by points 700, 702 and 701. The triangle 70 having for corners the points 700 to 702 covers the range of colours that can be obtained. The point 710 corresponds to a mixture of red and green and is therefore located on the segment linking the points 700 and 702. The points 712 and 711 correspond to a mixture of blue and green and are therefore placed on the segment linking the points 701 and 702.

Preferably, during the step 52, the controller 210 searches for the triangle 71 of maximum compactness (the compactness being calculated by obtaining the ratio between the area of the triangle 71 and its perimeter squared).

FIG. 8 illustrates the secondary colour base corresponding to a frame 62 received by the controller during the step 51 and determined during the step 52. This new base corresponds to a triangle 81 covering an area 82 of a gamut comprising each of the pixels of the frame 82.

The area 82 is inscribed in the triangle 81 having for corners the points 810, 811, and 812 which then constitute the new colour base in which all the pixels of the area 82 can be expressed.

The points 810 and 812 correspond to a mixture of red, green and blue and are therefore not on the edges of the triangle having for corners the points 700 to 702 associated with the primary colours. The point 811 corresponds to a mixture of blue and red. By using an illumination from LEDs, the mixture of two or three primary colours can be adapted. It is, in practice, possible to obtain all the colours resulting from the sum of a certain quantity of blue, green and/or red by switching on the corresponding LEDs for a suitable time and/or intensity. There is thus a great deal of flexibility in the choice of the secondary colour base.

According to a first variant of searching for the triangles 71 and 81, during the initialization step 50, a number of triangles (represented for example by the coordinates of their corners or the equations defining their sides) included in the triangle 70 are determined and stored, with, preferably, their compactness and the data concerning the percentage of primary colour associated with each of its corners. During the step 50, the microcontroller 210 checks for all the predetermined triangles that each pixel of the image received (the pixels being represented symbolically by black dots) is in the predetermined triangle concerned, then selects the triangle that has the greater compactness. It is always possible to find such a triangle, the triangles 72 and 82 always comprising all the pixels.

According to a second variant of searching for the triangles 71 (respectively 81), during the step 52, starting from the triangle 72 (respectively 82), the microcontroller drags along the sides of the triangle, progressively or by dichotomy, each corner to determine a triangle and checks whether all the pixels of the image are contained in the duly determined triangle. If all the pixels of the image are effectively contained in the triangle, the process is repeated by trying to reduce the compactness or the size of the triangle, otherwise it is stopped (if the triangles are determined by progressively dragging the sides) or repeated by increasing the compactness of the triangle (if the triangles are determined by dichotomic dragging of the sides). Generally, the repetitions stop after a predetermined maximum number, and/or when an appropriate triangle compactness is less than a predetermined compactness and/or when the compactness difference between an appropriate triangle and a triangle that is inappropriate is less than a predetermined value.

According to different variants for determining the triangle 71, the corners of the triangle 71 are chosen on the three sides of the triangle 72 (the corners of the triangle 71 being on three separate sides or on two separate sides of the triangle 72. According to other variants, the corners of the triangle 71 are chosen outside the sides of the triangle 72 (for example, by distorting the triangle 72 homothetically, or by retaining one or two corners of the triangle 71 on one or two sides of the triangle 72, the third corner of the triangle 71 being placed inside the triangle 72).

According to a variant for selecting the triangles 71 and 81 according to the image, a quality criterion is provided and, during the step 52, only the triangles that do not cover a predetermined percentage of pixels of the image (typically at least 90%, for example 90%, 95%, 99%, 99.9%) are rejected. This variant allows certain isolated pixels not to be considered and therefore provides a saving in light power.

When the triangle 71 (respectively 81) is determined, during a step 53, the microcontroller 210 encodes each of the pixels according to the duly determined triangle.

If, according to a variant of the invention, all the pixels are not in the triangle 71 (respectively 81), these pixels are associated with a nearby pixel corresponding to an approximate colour. This pixel is, for example, located on one of the sides of the triangle 71 (respectively 81), preferably as near as possible to or on the straight line linking the pixel concerned to the centre of the triangle 72 (respectively 82).

According to a variant of the invention, in order to simplify the search for a triangle encompassing all the pixels of a frame and/or the check that all the pixels of this frame belong to a determined triangle, the controller first determines a convex envelope linking the peripheral pixels. This envelope comprises all the pixels by definition and it is sufficient to search for a triangle encompassing the peripheral pixels and/or check that the peripheral pixels are contained in the determined triangle for the triangle search and/or the check to be valid for all the pixels of the image.

Then, during a step 54, the controller determines and transmits control data 423 to the LED driver 213 according to the secondary colour base. The control data 423 specifies the on time and/or intensity of the LEDs for each colour in each frame. During this step, the controller also transmits the data 422 representative of the image encoded according to the secondary colour base to the imager driver 214 which in turn transmits it to the imager 205.

Following the step 54, the step 50 is repeated.

FIG. 6 gives an example of dynamic illumination management for two successive images corresponding to two frames 61 and 62, the LED driver 213 controlling the on time of each LED according to the secondary colour base. Each of the frames 61 and 62 is divided into three time slots, respectively 610 to 612 and 620 to 622.

Each of the lines 600 to 604 illustrates the management of the colours over time, and more specifically:

the line 600 illustrates the average perception of a colour in each of the time slots 610 to 612 and 620 to 622;
  the lines 602 to 604 show the control of the LEDs respectively coloured red, green and blue (or the perception of these LEDs that are either on or off).
  the line 601 indicates the result of the instantaneous summing of the illumination beams corresponding to the red, green and blue LEDs.

For each frame, the three corresponding time slots are mostly respectively red, green and blue, but can include an unsaturated part according to the calculation of the step 51, as illustrated on the line 601.

As an illustration, FIG. 6 corresponds to a calculation of the step 51 having determined that the area 72 of the pixels corresponding to the frame 61 is inscribed in a triangle having for corners the points 710, 711 and 712 respectively corresponding to unsaturated colours of type:

red+25% green;
green+25% blue;
blue+33% green.

Thus, during the first time slot 610, the or each red LED will be on throughout the time slot and the or each green LED will be on for 25% of the time which gives the average as represented on the line 600.

Similarly, during the second time slot 611 (respectively third time slot 612), the or each green (respectively blue) LED will be on throughout the duration of the time slot and the or each blue (respectively green) LED will be on for 25% (respectively 33%) of the time.

For the following time slot 62, as an illustration, the step 51 has determined that the area 92 of the pixels is inscribed in a triangle having for corners the points 810, 811 and 812 respectively corresponding to unsaturated colours of type:
red+5% blue+25% green;
green+33% blue+2% red;
blue+25% red.

Thus, during the time slot 620, the or each red LED will be on throughout the duration of the time slot and the blue and green LEDs will be on respectively 5% and 25% of the time which gives the average as represented on the line 600.

Similarly, during the time slot 621 (respectively 622), the or each green (respectively blue) LED will be on throughout the duration of the time slot, the or each blue (respectively red) LED will be on for 33% (respectively 25%) of the time and the or each red LED will be on for 2% of the time (respectively the or each green LED will be off).

According to an embodiment variant of the invention, to partially introduce a red, green or blue colour during a determined time slot, the or each corresponding LED is switched on throughout the time slot. Thus, according to a method of modulating the light intensity of the LEDs, the driver 213 controls the intensity of the supply current to the LEDs to vary the transmitted light power. FIG. 9 represents a curve 92 giving the relative light intensity 91 (Y axis) according to the controlling electrical intensity 90 (expressed in mA on the X axis). The driver 213 thus receives, from the controller 210, the relative light intensity for each LED colour and for the three time slots of a frame (for example, for the time slot 610: 1 for red, 0.33 for green and 0 for blue). Then, the driver 213 converts them into a light intensity control according to time and the or each LED concerned (for example via a conversion table and/or by calculation (in particular in the roughly linear part of the curve 92 corresponding to intensity values 90 less than 5 mA according to the example illustrated in FIG. 9)).

According to this variant, if the LED array 200 includes several LEDs of the same colour, according to a method of partially switching on the LEDs of one and the same colour, the driver 213 can also switch on only some of the LEDs of this colour (for example, if the array 200 includes 30 green LEDs, to obtain 33% green in the time slot 610, the driver 213 can request the switching on of a maximum of 10 green LEDs, the 20 other green LEDs remaining off).

According to this variant, if the LED array 200 includes a number of LEDs of one and the same colour, the driver 213 can also mix the two methods of modulating the light intensity of a colour and of partially switching on the LEDs of this colour (for example, if the array 200 includes 30 green LEDs, to obtain 33% green in the time slot 610, the driver 213 can request the switching on with 50% of the maximum intensity of 20 green LEDs, the 10 other green LEDs remaining off).

Thus, according to the invention, the duration of the light pulses transmitted by the LEDs and/or their light intensity is adjusted frame by frame according to the secondary colour base. In other words, the time and/or the energy of the coloured LEDs can vary from one image to the next and different colour LEDs can be switched on at the same time. In this way, the illumination source is very flexible and is optimized to obtain a better quality projected image and/or reduce the overall energy consumption (the LEDs being on for a shorter time and/or being powered with a lesser electrical intensity).

According to an embodiment variant of the invention illustrated by FIG. 10, the images received by the controller are already encoded according to a secondary colour base. Data representative of the secondary colour base is also received by the controller. According to this variant, the images are, in effect, encoded according to the secondary colour base (according to any one of the methods described previously), for example, after the encoding operation, or during the operation for storing on any medium, or even on sending the images to the controller. Thus, the means of determining the secondary colour base can advantageously be transferred to a remote device, the duly encoded images being able to be used by a number of image display systems (in particular by projectors including an illumination source with or without LEDs). The means of determining the secondary colour base can also be transferred to any dedicated equipment inside the projector (for example, in the image reception means).

Thus, according to this variant, after an initialization phase 100, during a step 101, the controller waits for then receives the data representative of an image in the secondary colour base dependent on the image received or a set of several images. It also receives the data representative of the secondary colour base. The data representative of the base is, for example, a code specific to several possible bases pre-stored in the memory of the controller, possibly downloaded in advance, or the coordinates of this secondary colour base in a primary colour base.

Then, the controller performs a step 54 for transmitting the data to the LED driver 213 and the image encoded according to the secondary colour base to the imager driver 214 which in turn transmits it to the imager 205. This step is similar to the step 54 illustrated by FIG. 5, so it carries the same reference and will not be described in any further detail.

Then, the step 101 is repeated.

Naturally, the invention is not limited to the embodiments described above.

In particular, the invention is compatible with any type of projector (in particular front or overhead projectors) comprising at least one imager lit by a sequentially coloured beam from coloured LEDs.

Those skilled in the art can also adapt the invention to any type of mechanical and/or optical structure using the coloured LEDs. They can, in particular, vary the number of LEDs of each colour (for example from one LED of each colour (high power LED) to more than ten LEDs of each colour). The positioning of the LEDs in the illumination system can vary: they can be in a flat monolithic array as illustrated by FIG. 3 or be associated with a number of monochrome LED arrays (for example, three respectively green, blue and red LED arrays) on one and the same plane or not (the structure possibly comprising dichroic return mirrors, enabling beams of different colours to be combined into a single beam illuminating the or each imager) or even remote from the imager, the coloured beams being transmitted to the or each imager via appropriate optical systems (for example, via optical fibres).

The invention is also compatible with illumination systems comprising LEDs of different colours, for example cyan or yellow, not necessarily red, green or blue, or even comprising green, blue or red LEDs of different wavelengths (for example green LEDs at 520 nm and 560 nm, and/or blue LEDs at 440 nm and 460 nm, and/or red LEDs at 600 nm and 630 nm). Thus, the gamut can be extended. According to this variant, the determination of the secondary colour base and the encoding of the images in this base takes into account the characteristics of the LEDs (implemented when the means of determining the secondary colour base are associated with the illumination means or possible when the means of determining the secondary colour base and the encoding means are remote, in the case of images encoded outside the LED control means), not necessarily red, green or blue respectively associated with a single wavelength since the range of possible colours is greater (thus, for example, a triangle is defined which comprises a predetermined percentage of pixels of an image in the polygon representative of the LEDs (colours and associated power) forming the illumination means). According to this variant, all the colours resulting from the sum of a certain quantity and/or type of blue, green and/or red are obtained by switching on (via the LED driver) the selected LEDs for an appropriate time and/or appropriate intensity.

As an illustration, FIG. 11 presents a gamut according to this variant of the invention, associated with a system comprising green LEDs 1113 and 702 at 520 nm and 560 nm, blue LEDs 701 and 1114 at 440 nm and 460 nm and red LEDs 700 at a single wavelength, for example, the primary colour base is associated with the green LEDs 702 at 560 nm, the blue LEDs 701 at 440 nm and the red LEDs 700. Then, according to the invention, for a first given image or a first set of relatively saturated images, the secondary colour base comprises, for example, the green 1113 at 520 nm, the blue 701 at 440 nm and the red 700 that corresponds to a triangle having for corners the points 1113, 701, and 700; then, for a second given image or a second, less saturated, set of images (corresponding to the set of pixels 1117 illustrated diagrammatically), the secondary colour base comprises, for example:

- a mixture of green 1113 at 520 nm and blue 1114 at 460 nm (point 1112 corresponding to an unsaturated colour obtained by selecting the LEDs 1113 and 1114 and time and/or intensity control according to the percentage of green and blue corresponding to the point 1112);
- a mixture of green 702 at 560 nm and red 700 (point 1110 corresponding to an unsaturated colour obtained by selecting the LEDs 702 and 700 and time and/or intensity control according to the percentage of green and red corresponding to the point 1110); and
- a mixture of green 702 at 560 nm, blue 701 at 440 nm and red 700 (point 1114 corresponding to an unsaturated colour obtained by selecting the LEDs 702, 701 and 700 and time and/or intensity control according to the percentage of red, green and blue corresponding to the point 1114).

Thus, more generally, with the system given by way of illustration, the secondary colour base comprises at least three colours, each colour being obtained according to one combination out of all the possible combinations comprising the green at 520 nm or 560 nm, the blue at 440 nm or 460 nm and the red taken in isolation or in a mixture of two to five distinct colours.

Moreover, the invention is not limited to the case where the secondary colour base comprises only three colours, but can be extended to secondary colour bases comprising more than three colours (for example, four, five, six, etc.). Thus, as an illustration, the secondary colour base can comprise p colours (p being, for example, three, four, five, six, etc.). According to this variant, to determine the secondary colour base, instead of defining a triangle associated with the secondary colour base, a polygon with p corners is defined, each of the corners representing an LED colour or a mixture of LED colours, the polygon encompassing all or some (typically at least 90%) of the pixels of an image or a set of images. According to the invention, the number of colours in the secondary colour base can also vary dynamically from one image to the next.

According to a variant of the invention implementing LEDs corresponding to more than three distinct colours, the step for determining the secondary colour base comprises a step for selecting a polygon, the corners of which correspond to an LED colour; according to this variant, the selection step comprises a step for checking a predetermined condition. According to this condition, each polygon that is a candidate for selection comprises all the pixels (or, according to a variant, at least a predetermined quantity, for example, 90% of pixels). The selection step is completed by the choice of a polygon, the corners of which specify the secondary colour base, out of the polygon or polygons that satisfy the predetermined condition by, where appropriate, taking into account their compactness (a compactness being preferred) and/or, if appropriate, the percentage of pixels covered by the polygon (a high percentage being preferred).

The invention is by no means limited to the case where the LED control system is as described previously, but can, by contrast, be extended to any system performing an analysis of one or more images to determine an area of the colour gamut comprising a predetermined percentage of pixels of the or each image concerned and capable of being covered by the LEDs. In particular, when the content of a number of consecutive images is relatively similar, the corresponding secondary colour base can, advantageously, be determined, according to the invention, over the set of these images or over a limited number of these images, even just one of these images. In particular, the secondary colour base can advantageously be determined at regular intervals (for example, every second, or every n images (n being, for example, 2, 5, 12, 24, etc.) or on an abrupt variation of the content of an image (identified, for example, by performing a correlation between two consecutive images of a stream of frames received) or even in a way synchronized on intra-encoded images (in an MPEG2 or MPEG4 stream, for example) (the determination of the secondary colour base being done from intra-encoded images, the predictive or bipredictive images using the same secondary colour base as that associated with the intra image corresponding to them).

According to a variant of the invention, the secondary colour base is determined for certain images (for example as indicated above) from the content of these images, and the secondary colour base is determined for the subsequent images by simply checking that a predetermined percentage of pixels in these images can be encoded with positive coordinates in the secondary colour base determined previously. If they can, the subsequent images are encoded in the secondary colour base determined previously. If not, the subsequent images are either encoded with this secondary colour base, certain pixels capable of being encoded approximately, or a new colour base is determined from the first subsequent image that does not satisfy the minimum percentage of pixels condition that can be encoded with the secondary colour base determined previously.

The invention is also compatible with a secondary colour base that comprises more than three elements and, in particular, that comprises white (obtained, for example, with a white light or by superimposing several lightings each associated with a primary colour).

The invention is also compatible with any type of imager (or micro-display); thus, it can be applied not only to projectors with transmissive LCD (Liquid Crystal Display), but also to projectors with DMD (Digital Micromirror Device produced by Texas Instruments®) type imagers or LCOS (Liquid Crystal On Silicon) type imagers (those skilled in the art incorporating the appropriate optical elements (polarisers, lenses, mirrors, etc.) between the illumination source and the imager).

The invention claimed is:

1. Method of displaying a set of at least one image by illuminating an imager with a beam provided by light-emitting diodes of different colours wherein said method comprises:
- a step for receiving each image of said set encoded according to at least three primary colours of a colour base, called a primary colour base, said primary colours being represented as the corners of a primary polygon covering a gamut of colours that can be obtained;
- a step for determining a colour base dependent on the at least one image of said set, called a secondary colour base, including at least three secondary colours being represented as the corners of a secondary polygon covering a colour gamut comprising each of the pixels of the at least one image of said set or covering a predetermined percentage of pixels of the at least one image of said set, wherein each of said secondary colours is a primary colour or a mixture of primary colours, wherein the secondary polygon is included in the primary polygon, and wherein said step for determining the secondary colour base comprises selecting said secondary polygon that has a maximum compactness, the compactness being calculated by obtaining the ratio between the area of the secondary polygon and its perimeter squared;
- a step for dynamically controlling said diodes according to said secondary colour base;
- a step for converting the at least one image of said set from said primary colour base to said secondary colour base, by encoding each of the pixels of the at least one image of said set according to the secondary colours of said secondary colour base;
- a step of controlling the imager with the at least one converted image of said set.

2. Method according to claim 1, wherein said secondary colour base comprises at least one secondary colour corresponding to a mixture of two primary colours of the primary colour base.

3. Method according to either claim 1, wherein said secondary colour base comprises three secondary colours.

4. Method according to claim 1, wherein said step for dynamically controlling said diodes comprises a step for controlling the on time of said diodes according to said secondary colour base.

5. Method according to claim 1, wherein said step for dynamically controlling said diodes comprises a step for controlling the light intensity of said diodes according to said secondary colour base.

6. Method according to claim 1, wherein said step for dynamically controlling said diodes comprises a step for selecting said diodes according to said secondary colour base.

7. Method according to claim 1, wherein said primary colour base is distinct from said secondary colour base.

8. Method according to claim 7, wherein said step for determining a colour base comprises a step for calculating an area covered by said secondary polygon and encompassing at least 90% of the pixels of the at least one image of said set, said colour base being determined according to said area.

9. Method according to claim 8, wherein said area encompasses 100% of the pixels of the images of said set.

10. Method according to claim 1, wherein, in said step for receiving said set of at least one image, each image is received in said secondary colour base, said step for determining a colour base comprising a step for receiving data representative of said secondary colour base.

11. Method according to claim 1, wherein said set comprises a single image.

12. Illumination system for lighting an imager for projecting a set of at least one image and comprising light-emitting diodes of different colours providing a beam illuminating said imager, wherein said system comprises:
- means of receiving each image of said set being encoded according to at least three primary colours of a colour base, called a primary colour base, said primary colours being represented as the corners of a primary polygon covering a gamut of colours that can be obtained;
- means of determining a colour base dependent on the at least one image of said set called a secondary colour base, comprising at least three secondary colours being represented as the corners of a secondary polygon covering a colour gamut comprising each of the pixels of the at least one image of said set or covering a predetermined percentage of pixels of the at least one image of said set, wherein each of said secondary coulours is a primary colour or a mixture of primary colours, wherein the secondary polygon is included in the primary polygon, and wherein said means of determining the secondary colour base comprises means for selecting said secondary polygon that has a maximum compactness, the compactness being calculated by obtaining the ratio between the area of the secondary polygon and its perimeter squared;
- means of dynamically controlling said diodes according to said secondary colour base;
- means of converting the at least one image of said set from said primary colour base to said secondary colour base, by encoding each of the pixels of the at least one image of said set according to the secondary colours of said secondary colour base,
- means of controlling the imager with the at least one converted image of said set.

13. Image projector comprising,
at least one imager;
at least one projection lens for imaging said at least one imager on a projection screen;
at least one illumination system according to claim 12 for lighting said at least one imager and comprising light-emitting diodes providing a beam illuminating said at least one imager.

* * * * *